United States Patent
Oseguera (10) Patent No.: US 6,974,017 B2
(45) Date of Patent: Dec. 13, 2005

(54) TOTE CONVEYING APPARATUS AND METHOD

(76) Inventor: Anthony Damian Oseguera, 1099 Rogge Rd., Salinas, CA (US) 93906-1305

( * ) Notice: Subject to any disclaimer, the term of this patent is extended or adjusted under 35 U.S.C. 154(b) by 0 days.

(21) Appl. No.: 10/659,603

(22) Filed: Sep. 9, 2003

(65) Prior Publication Data

US 2004/0060797 A1 Apr. 1, 2004

Related U.S. Application Data

(60) Provisional application No. 60/410,844, filed on Sep. 13, 2002.

(51) Int. Cl.$^7$ .............................................. B65G 47/44
(52) U.S. Cl. ..................................... 198/311; 198/528
(58) Field of Search ..................... 198/311, 360, 369.2, 198/527, 528, 537, 861.1, 780

(56) References Cited

U.S. PATENT DOCUMENTS

| | | | |
|---|---|---|---|
| 2,782,943 A | 2/1957 | Jones et al. | |
| 3,503,196 A | 3/1970 | Jarrett | |
| 3,512,336 A * | 5/1970 | Rosecrans | 53/537 |
| 3,581,865 A | 6/1971 | Adams | |
| 4,124,967 A * | 11/1978 | Beer et al. | 53/446 |
| 4,400,983 A | 8/1983 | Peterson et al. | |
| 4,557,368 A * | 12/1985 | Alameda | 198/313 |
| 4,739,607 A | 4/1988 | Annas, Sr. et al. | |
| 5,097,755 A | 3/1992 | Hill | |
| 5,640,833 A | 6/1997 | Gerber | |
| 5,964,081 A | 10/1999 | Ingram | |
| 6,158,574 A * | 12/2000 | Williams et al. | 198/791 |
| 6,378,281 B1 | 4/2002 | Ottaway | |
| 6,533,099 B2 * | 3/2003 | Bonham et al. | 198/360 |
| 6,680,482 B1 * | 1/2004 | Perrins et al. | 198/845 |
| 6,705,461 B2 * | 3/2004 | Kuharevicz et al. | 198/861.1 |

* cited by examiner

Primary Examiner—James R. Bidwell (57) ABSTRACT

A method and apparatus for moving and packing freshly harvested agricultural products in such a way as to minimize the damage to agricultural products from bruising and breakage resulting from falling into storage bins. This invention uses a hydraulic-driven conveyor belt to move smaller transport containers which are physically closer to the actual point where the agricultural products are discharged into the waiting transport containers. Because the transport container is physically closer to the discharge point of the agricultural products, the actual distance the agricultural products fall is greatly reduced as is the probability of damage from bruising or breaking apart.

6 Claims, 7 Drawing Sheets

TOTE CONVEYING APPARATUS AND METHOD

CROSS-REFERENCE TO RELATED APPLICATION

This application claims the benefit of Provisional Patent Application Ser. No. 60/410,844, filed Sep. 13, 2002.

FEDERALLY SPONSORED RESEARCH

Not Applicable

SEQUENCE LISTING OR PROGRAM

Not Applicable

BACKGROUND

1. Field of Invention

This invention relates to a method and apparatus for moving and packing freshly harvested and spray-washed agricultural products by means of system of conveyors that moves receptacles called "totes" to a position under a discharge chute for filling and then moves the filled totes onto a loading station for further transport to a processing facility.

2. Description of the Prior Art

Agricultural products such as lettuce, broccoli, cauliflower, are typically harvested manually and placed directly onto a conveyor belt which moves the agricultural products under and past a series of nozzles which field-wash the agricultural products by spraying chemically treated water directly onto the vegetables as they pass underneath or alongside the nozzles. The freshly harvested agricultural products are visually inspected as they are spray-washed by the horizontally or downwardly-directed nozzles and damaged or soiled vegetables or discarded or returned to the beginning of the washing conveyor as the case may be. The spray-wash nozzles are mounted on the sides of an upward-angled conveying apparatus that moves the washed vegetables to a chute which downwardly discharges them into empty transport bins which have been sequentially placed on tractor-drawn trailers. These cubical transport bins typically measure four (4) ft.×four (4) ft.×four (4) ft. and are typically made of a corrugated cardboard material.

Typically, a tractor or other farm vehicle will move the trailer upon which the bin is placed so as to position the bin under the discharge chute. The freshly harvested and spray-washed vegetables are discharged into the bin until it is filled and the tractor moves the trailer so as to position the next bin under the discharge chute and the process of filling the bin starts over again. When all of the bins on a given trailer have been filled, the packing process stops while the tractor hauls away the trailer and another tractor positions another trailer loaded with empty bins so as the bins can be placed under the discharge chute.

While some agricultural products such as broccoli and cauliflower possess a fibrous and compact composition and are thus able to withstand the impact of a 4–5 foot drop into a transport bin without bruising or other damage, other vegetables such as lettuce, and especially cored lettuce and baby lettuces, are more fragile and will bruise easily or break apart when subjected to a 4–5 foot drop into a storage bin. Industry estimates indicate that ten to fifteen percent (10–15%) of the cored lettuce harvested for "fresh pack" shipments will be rejected by the packaging facility as "unacceptable" because of the damage these agricultural products receive from falling into the transport bins.

In an industry where time is critical, any delays in the movement of the vegetables from the point of harvest to the point of packing will only serve to further delay the ultimate delivery of the freshly harvested and packed vegetables to a remote processing or packaging facility. These delays increase the risk of damage to the vegetables in the bins and also disrupt the rhythm of the harvesting and packing crews thereby decreasing overall efficiency of the harvesting and packing operation.

This invention seeks to minimize damage to freshly harvested and spray-washed agricultural products by reducing the vertical distance the agricultural products will fall after leaving the chute which guides the agricultural products into the transport receptacle. This invention accomplishes its purpose by moving smaller industry-standard transport receptacles called "totes" to a position slightly below that of the lower edge of the discharge chute and thereby drastically reducing the vertical distance the agricultural products will fall into the transport "tote." The smaller dimensions of the tote (typically: 24 inches long×20 inches wide×14 inches high) and the minimal vertical clearance between the top of the tote and the bottom of the discharge chute illustrate the dramatic reduction in vertical distance that the freshly harvested agricultural products must fall.

This invention will also eliminate operation downtime as the trailer transporting the receptacles is hauled away and a new trailer is positioned to receive the filled totes. The tote conveyor system has enough space to permit "stacking" or "lining up" of filled totes on the surface of the conveyors so that the filling of the totes does not have to cease while a new trailer is being placed in position to receive them.

Several conveyor systems have been proposed in the past but most do not apply to the field of this invention. Those conveyor systems that do apply to the field of this invention are typically manpower-intensive or limited by what the host machine harvests.

For example, U.S. Pat. No. 4,739,607 (1988) to Annas et. al. discloses a conveyor system having three separate stations and return conveyor system that links the first and third stations. Although this invention uses a conveyor system to move a pallet to a work station, it requires two points of manual intervention. The first point requiring manual intervention is where someone must place the pallet on the return conveyor. The second is where someone must lift the pallet from the return conveyor to the workstation. Further, the Annas patent discloses an invention that is stationary and restricted to an industrial building or setting rather than being mobile and capable of on-site applications. Most, if not all other conveyor systems outside the agricultural product field are similarly restricted by their lack of mobility or the requirement for numerous points of manual intervention.

While U.S. Pat. No. 3,503,196 (1970) to Jarret discloses an invention that is mobile, it discloses the use of conveyors for moving the actual vegetable product from station to station and finally to an end point where the product is manually placed into a packing container. Manual packing is manpower-intensive and time-consuming, both of which are expensive and inefficient. This same requirement for manual packing is disclosed by U.S. Pat. No. 4,400,983 (1983) to Peterson et. al., U.S. Pat. No. 5,097,755 (1992) to Hill, U.S. Pat. No. 5,640,833 (1997) to Gerber, U.S. Pat. No. 5,964,081 (1999) to Ingram, and U.S. Pat. No. 6,378,281 (2002) to Ottoway.

OBJECTS AND ADVANTAGES

The present invention has been designed to solve the foregoing problems found in the prior art. Accordingly, the objects and advantages of the present invention are:

(1) to reduce bruising damage to agricultural products packed in the field.
(2) to eliminate work-stoppage previously necessitated by positioning a trailer with empty receptacles under a discharge chute.
(3) the reduce the number of workstations necessary to pack agricultural products in a transport receptacle.
(4) to reduce the number of laborers necessary to pack the transport receptacle.
(5) to provide a means for on-site packing.

Further objects and advantages of my invention will become apparent from a consideration of the drawings and the ensuing description of the invention.

SUMMARY

This invention provides a system of conveyors for moving a smaller transport receptacle under a chute discharging freshly harvested and spray-washed vegetables and then moving the filled transport receptacle to a transfer or loading station where it will be placed onto a trailer.

DRAWINGS

Drawing Figures

REFERENCE NUMERALS IN DRAWINGS 1 self-propelled spray-wash conveyor
2 platform
3 delivery conveyor belt
4 positioning conveyor belt
5 removal conveyor belt
6 tote
7 loading station
8 packing and filling station
9 discharge chute
10 removal station
11R conveyor control station: clockwise movement
11L conveyor control station: counter-clockwise movement
12 lateral frame member—delivery, removal conveyor belt
13 lateral frame member—positioning conveyor belt
14 vertical support member
15 guide rail
16 safety shield: delivery, removal conveyor belts
17 safety shield: positioning conveyor belt—conveyor control station
18 safety shield: positioning conveyor belt—packing and filling station
19 hydraulic transmitter
20 external engine
21 supply manifold
22 hydraulic fluid supply line
23 hydraulic motor
24 hydraulic fluid return line
25 return manifold
26 switching mechanism
27 safety device
28 foot pedal
29 solenoid switch
30 shutoff valve
31 throttle
32 angled ramp
33 lateral frame member: angled ramp
34 cylindrical roller

DETAILED DESCRIPTION

Description—Simplest Embodiment

In its simplest embodiment, this invention utilizes a conveyor to move plastic transport containers called "totes" under an externally mounted discharge chute which fills moving totes with freshly harvested and spray-washed agricultural products. This invention then moves a filled tote to a loading station for manual placement onto a trailer for further transport to a packaging facility. The invention is designed to prevent bruise-damage to the agricultural products. The tote conveyor system accomplishes this goal through its design dimensions. The height of the horizontal surface of a conveyor above a platform upon which it is mounted is adjusted so as to minimize the vertical clearance between the uppermost edges of a tote and the lowest extremity of a discharge chute under which a tote must pass while being filled with agricultural products. A tote measures 20 inches wide by 24 inches long by 14 inches high and is therefore, considerably smaller than an industry standard packing and shipping container, a "bin", which is typically a 48 inch cube. By passing a smaller container under a discharge chute, the tote conveyor system dramatically reduces, and in fact, minimizes the distance agricultural products must fall into a packing container.

In this simplest embodiment, the tote conveyor system is comprised of a conveyor 4 which can be an externally powered conveyor belt, a plurality, of parallel cylindrical rollers 34, or other such device to effect or otherwise facilitate horizontal movement. Conveyor 4 is positioned between lateral frame members 12 which are supported by vertical support members 14 perpendicularly mounted on a platform 2 of some type. The height of conveyor 4 above a mounting platform 2 is adjusted so as to minimize the vertical distance between the upper edges of a tote 6 being moved by or on a conveyor 4 and the lower edge of a discharge chute 9 dispensing agricultural products into a tote 6. This simplest embodiment can be stationary in the field or simply upon a drawn vehicle such as a wagon or cart. The elements of this simplest embodiment are seen in the description of the preferred embodiment and are shown with the enhancements comprising the preferred embodiment in FIG. 2, FIG. 3, FIG. 4, and FIG. 5.

Description—Preferred Embodiment

The preferred embodiment of this invention is mounted on or is structurally a part of a self-propelled, mobile, spray-wash conveyor vehicle. This invention utilizes a series of conveyor belts to move plastic transport containers called "totes" under a discharge chute where the tote is filled with freshly harvested and spray-washed agricultural products. This invention then moves the filled tote to a loading station where the filled tote is manually placed on a trailer for further transport to a packaging facility. The invention is designed to prevent bruise-damage to the agricultural products by positioning the tote, which is considerably smaller than the industry standard packing and shipping container, under the discharge chute and thereby minimizing the vertical distance the agricultural products must fall into the packing container. This invention combines existing technology (the self-propelled, mobile spray-wash conveyor) with the inventive feature (the tote conveyor system) to enhance the overall efficiency of on-site spray-washing washing and packing of freshly harvested agricultural products.

Figure 1:
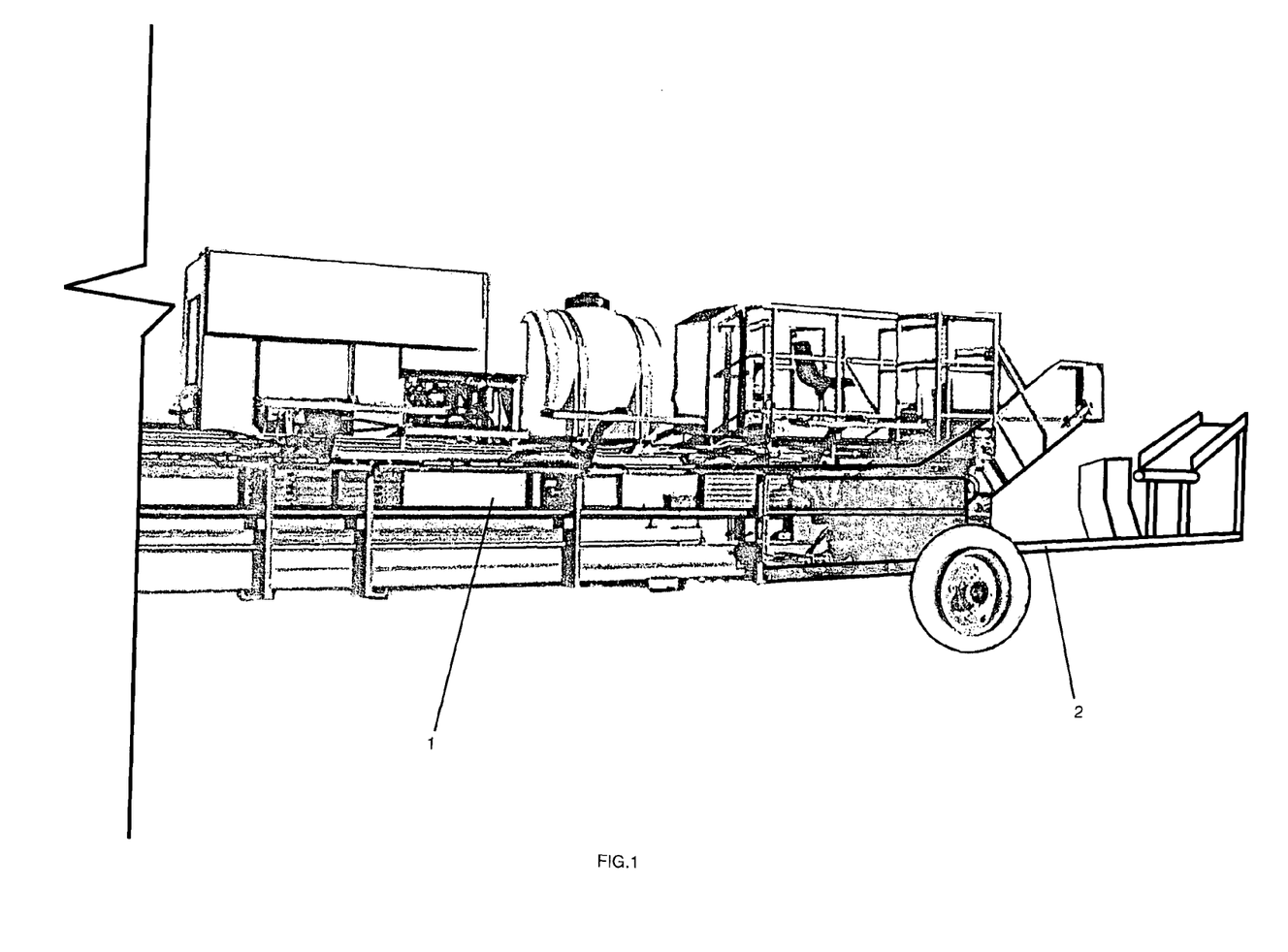
FIG. 1 shows the tote conveyor system attached to a self-propelled spray-wash conveyor.

FIG. 1 shows a perspective of the preferred embodiment of the tote conveyor system where the tote conveyor system is structurally integrated into and part of a self-propelled spray-wash conveyor 1. A self-propelled spray-wash conveyor 1 by itself is prior art and need not be described here. A mounting platform 2 upon which the tote conveyor system is housed rests on a cantilevered extension of a structural frame supporting a self-propelled spray-wash conveyor 1. In this configuration, the tote conveyor system moves with a self-propelled spray-wash conveyor 1. This configuration thereby eliminates the need for a separately drawn or self-propelled mounting platform housing; it also eliminates the need to continuously reposition a drawn or self-propelled platform with respect to a self-propelled spray-wash conveyor 1. Further, the integrated frame construction eliminates the possibility of fatigue and/or failure where a mounting platform 2 is attached to a self-propelled spray-wash conveyor 1.

Figure 2:
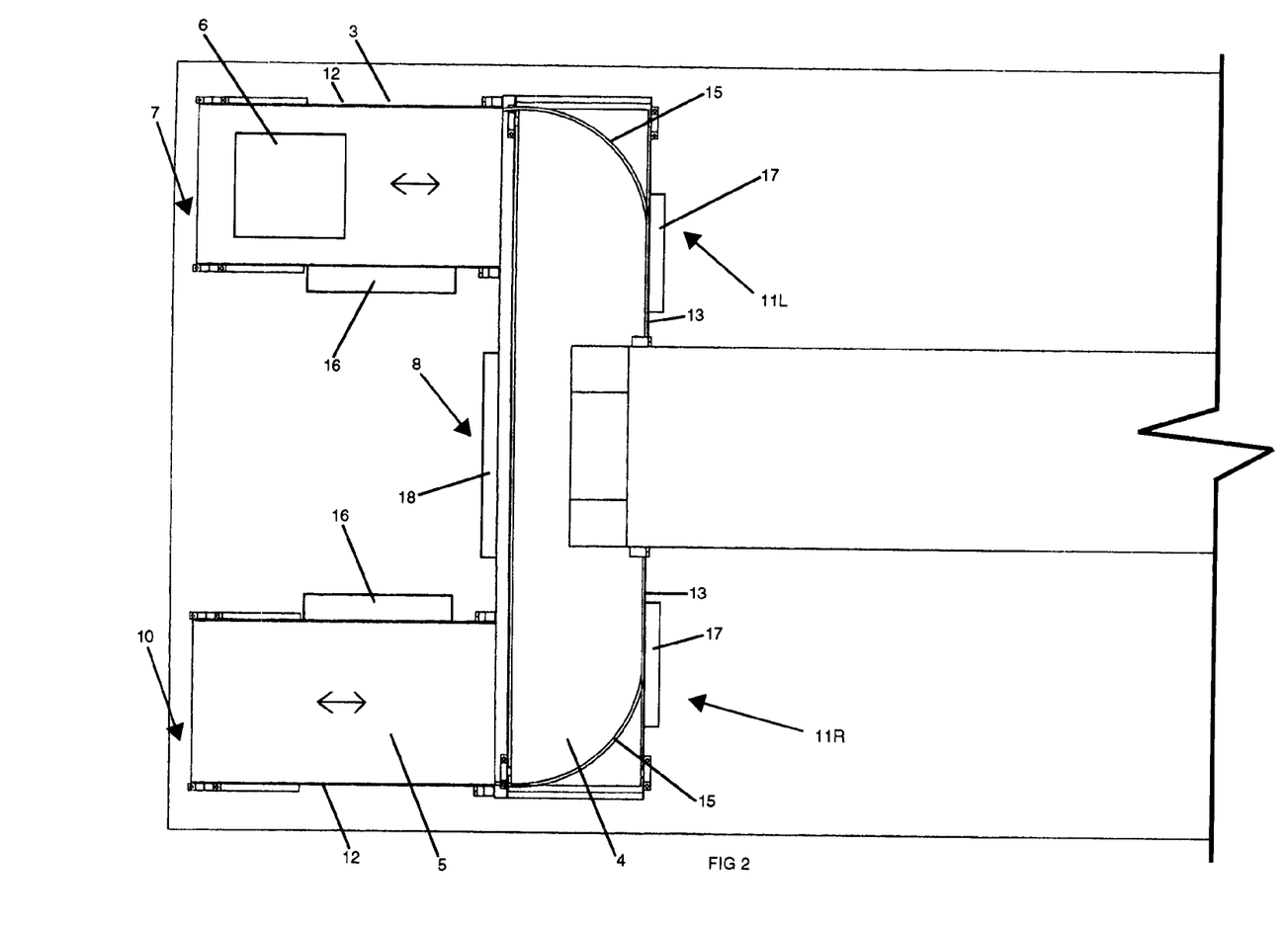
FIG. 2 shows a plan view of the tote conveyor system.

FIG. 2 is a plan view of the tote conveyor system showing most of the major components and work stations. The tote conveyor system is positioned on a mounting platform 2 and consists of three hydraulically-driven conveyor belts: a downward-sloping delivery conveyor belt 3, a horizontal positioning conveyor belt 4 adjacent to and at a 90 degree angle to the right of a delivery conveyor belt 3, and an upward sloping removal conveyor belt 5 adjacent to and at a 90 degree angle to the right of a positioning conveyor belt 4. The tote conveyor system moves a packing/shipping container or "tote" 6, from a loading station 7 to a position adjacent to a packing and filling station 8 and under a discharge chute 9 and then on to a removal station 10. A worker at a conveyor control station 11R, 11L regulates the speed and movement of conveyor belts 3, 4, 5 which are moving totes. Conveyor belts 3, 4, 5 are prior art configurations with the exception of a hydraulic drive system (see FIG. 6). Therefore, the description of conveyor belts 3, 4, 5 is not presented in this specification. Conveyor belts 3, 4, 5 are disposed between lateral frame members 12, 13 which are supported by vertical support members 14 (see FIG. 3 and FIG. 4 also) permanently attached to a mounting platform 2. Tubular guide rails 15 connect outboard lateral frame members 12 adjacent to delivery and removal conveyor belts 3, 5 to a lateral frame member 13 which is adjacent to a positioning conveyor belt 4. Vertical safety shields 16 are attached to vertical support members 14 and extend upward and outside of inboard lateral frame members 12 which are adjacent to delivery and removal conveyor belts 3, 5. Safety shields 16, prevent a worker at a packing and filling station 8 from coming into contact with delivery or removal conveyor belts 3, 5. Similarly, two more safety shields 17 are attached to vertical support members 14 supporting positioning conveyor belt 4 and extend upward and outside of a lateral frame member 13 to prevent a worker at a conveyor control station 11R, 11L from coming into contact with a positioning conveyor belt 5. Yet another safety shield 18 extends vertically upward from a platform 2 to keep a worker at a packing and filling station 8 from coming into contact with a positioning conveyor belt 4. Structural components such as platform 2 support members, lateral frame members 12, 13 and vertical support members 14 are typically made of stainless steel or some other similar corrosion-resistant, high tensile strength material. Similarly, safety shields 16, 17, 18 are also typically constructed of stainless steel or some other corrosion-resistant, high tensile strength material.

Figure 3:
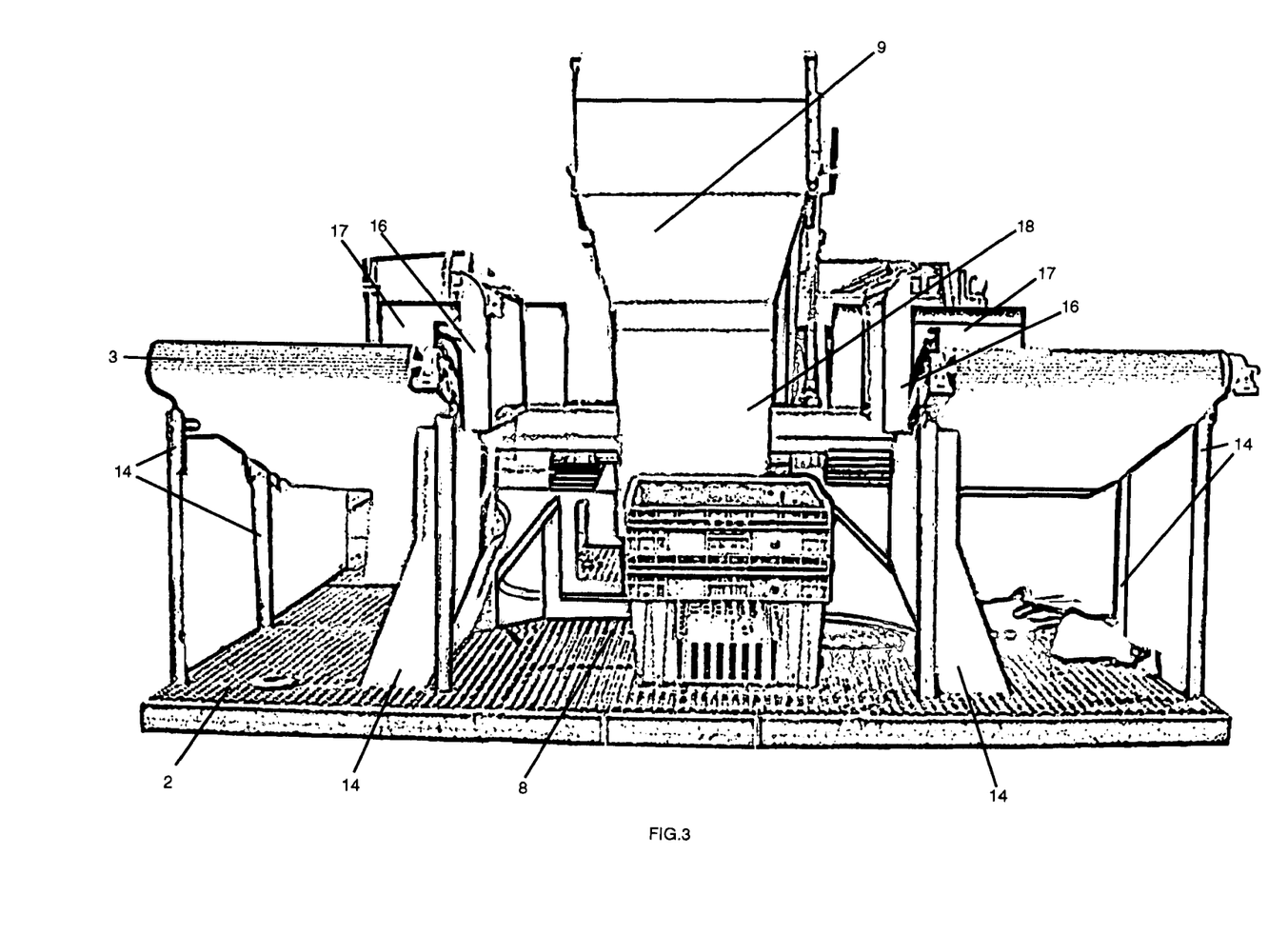
FIG. 3 shows an end-view of the tote conveyor system in perspective.

FIG. 3 shows an end-view of the tote conveyor system in perspective. This perspective shows a configuration of a platform 2 that consists of a single sheet or section of heavy-duty wire mesh, non-skid sheet metal, or other suitable platform material which is permanently mounted on top of a grid-like pattern of L-shaped or rectangular, tubular support members. A platform 2 may also be constructed of smaller rectangular sections of heavy-duty wire mesh, non-skid sheet metal, or other suitable platform material which are permanently mounted on top of or inserted into a grid-like pattern of support members. A platform 2 can also be constructed of a metal grates inserted into a grid-like pattern of support members. A platform 2 can also be constructed using solid, smooth sections or sheets of metal which have been configured with adhesive strips of non-skid material.

FIG. 3 also shows vertical support members 14 supporting a delivery conveyor belt 3 and a removal conveyor belt 5. FIG. 3 also shows safety shields 16, 18 protecting a worker at a packing and filling station 8 as well as safety shields 17 protecting an operator at a conveyor control station 11L, 11R on either side of a discharge chute 9.

Figure 4:
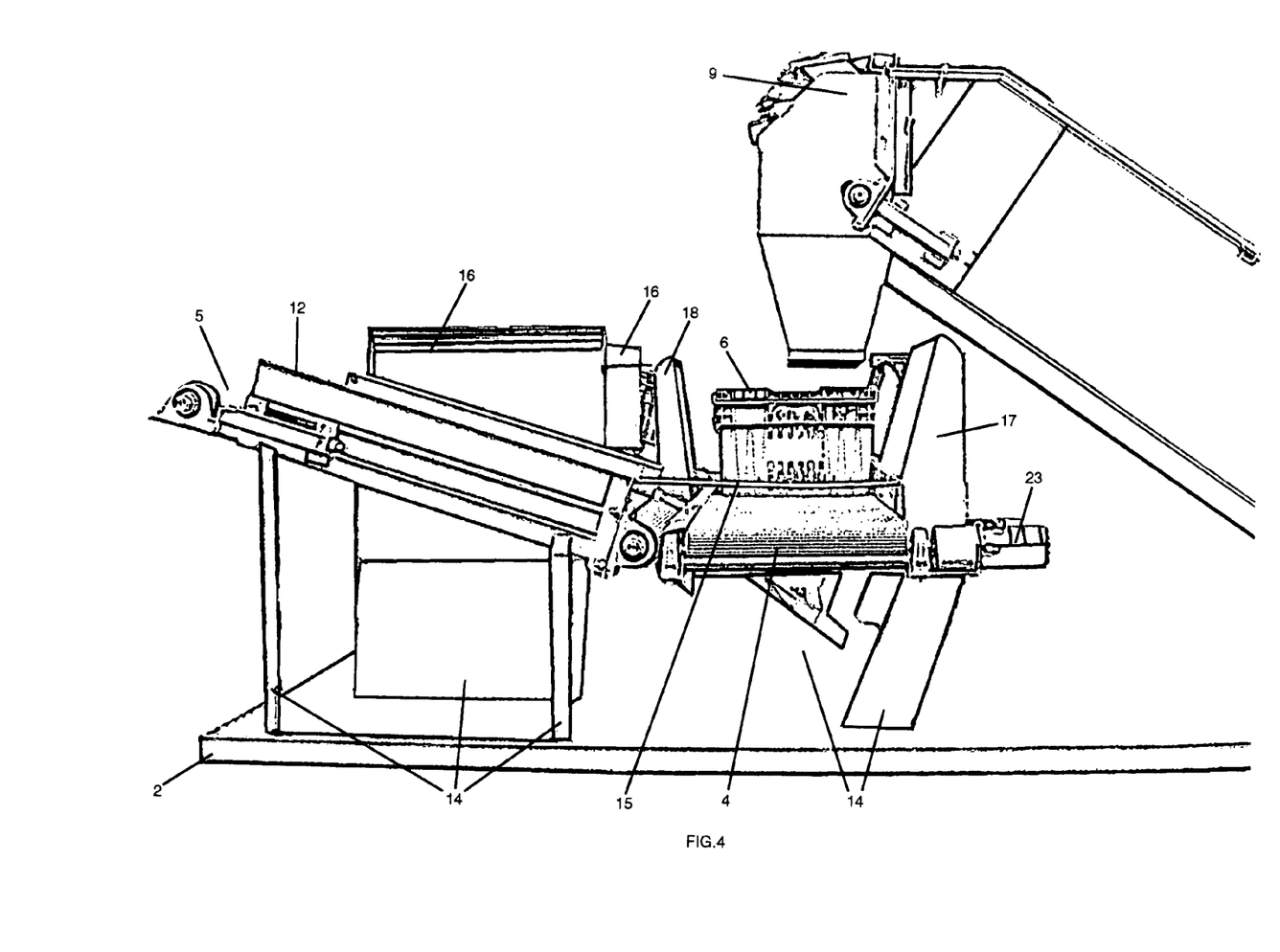
FIG. 4 shows a side view of the tote conveyor system in perspective.

FIG. 4 shows a side-view of the tote conveyor system in perspective. FIG. 4 illustrates a major advantage of the tote conveyor system over the prior art by showing the relatively small vertical distance agricultural products will fall between a discharge chute 9 and a tote 6 positioned underneath.

FIG. 4 also shows how vertical support elements 14 are mounted on a platform 2 to support a conveyor belt 4,5. Vertical support members 14 are typically constructed of stainless steel or some other suitable non-corrosive, high tensile-strength material. Vertical support members 14 can be rectangular such as those shown in FIG. 4 supporting an outboard lateral support frame 12. Vertical support members 14 can also be custom-fabricated or assembled to extend vertically upward as a safety shield 16, 17, 18.

FIG. 4 shows vertical support members 14 which have been custom-fabricated to slope downward under a conveyor belt 4 so as to allow workers to position themselves immediately adjacent to a safety shield 17, 18 and closer to a moving conveyor belt 4. Please refer back to FIG. 3 to see a custom-fabrication of a vertical support member 14 where working in close proximity to a moving conveyor belt 3, 5 is not necessary.

FIG. 4 also shows a curved guide rail 15 which will cause a tote 6 moving on a positioning conveyor belt 4 to change its orientation 90 degrees to the right while also moving onto a removal conveyor belt 5. FIG. 4 also shows the location of a hydraulic motor 23 on a conveyor belt 4.

Figure 5:
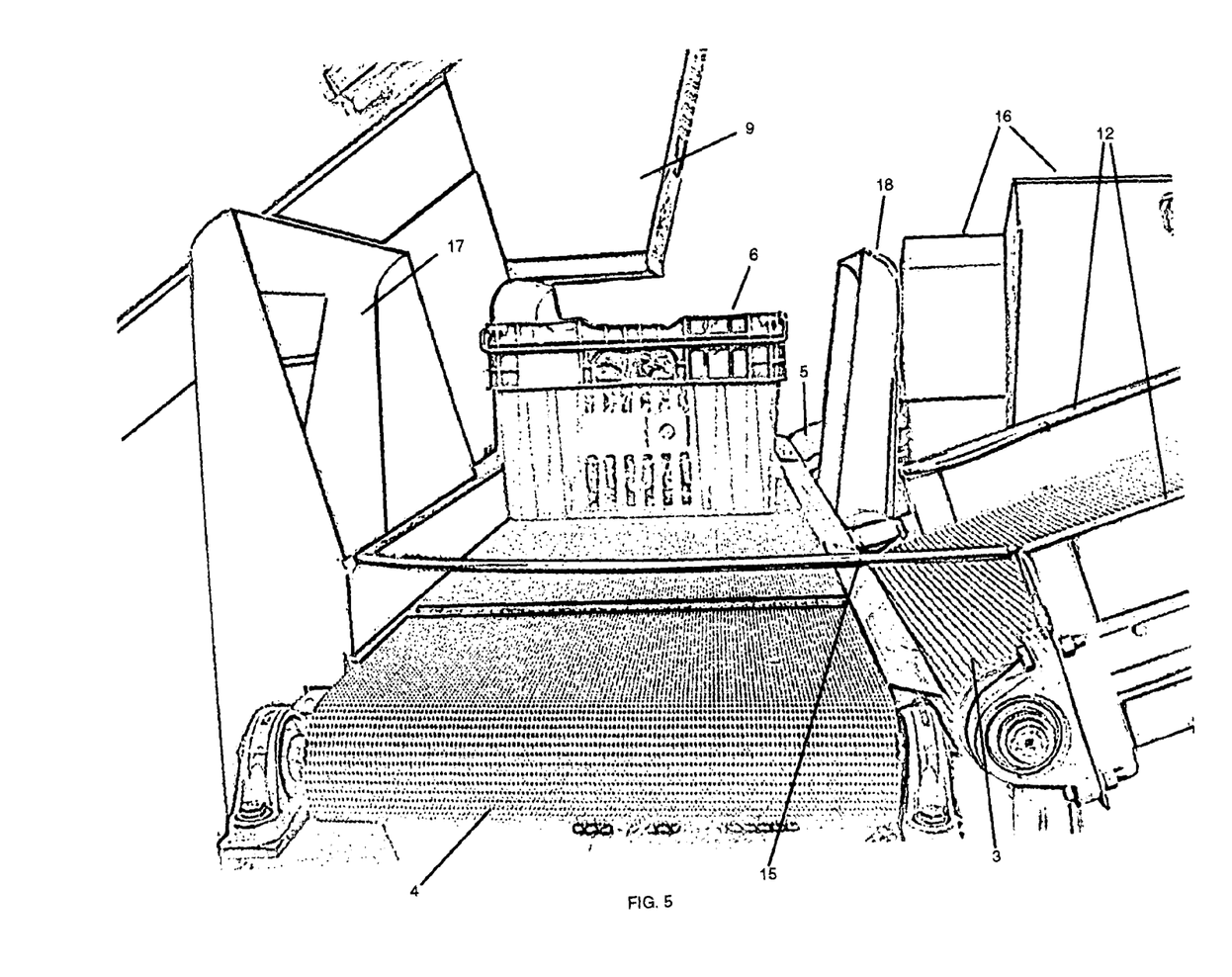
FIG. 5 shows a perspective of the conveyor system in operation.

FIG. 5 shows a perspective of the tote conveyor system in operation. In this frame, a tote 6 has moved down a supply conveyor belt 3 and onto a positioning conveyor belt 4 having had its orientation changed 90 degrees to the right by a curved guide rail 15 attached to lateral support frames 12. Safety shields 16, 17, 18 keep workers from coming into direct physical contact with conveyor belts 3, 4, 5. A discharge chute 9 is directing agricultural products into totes 6 moving along a positioning conveyor belt.

Figure 6:
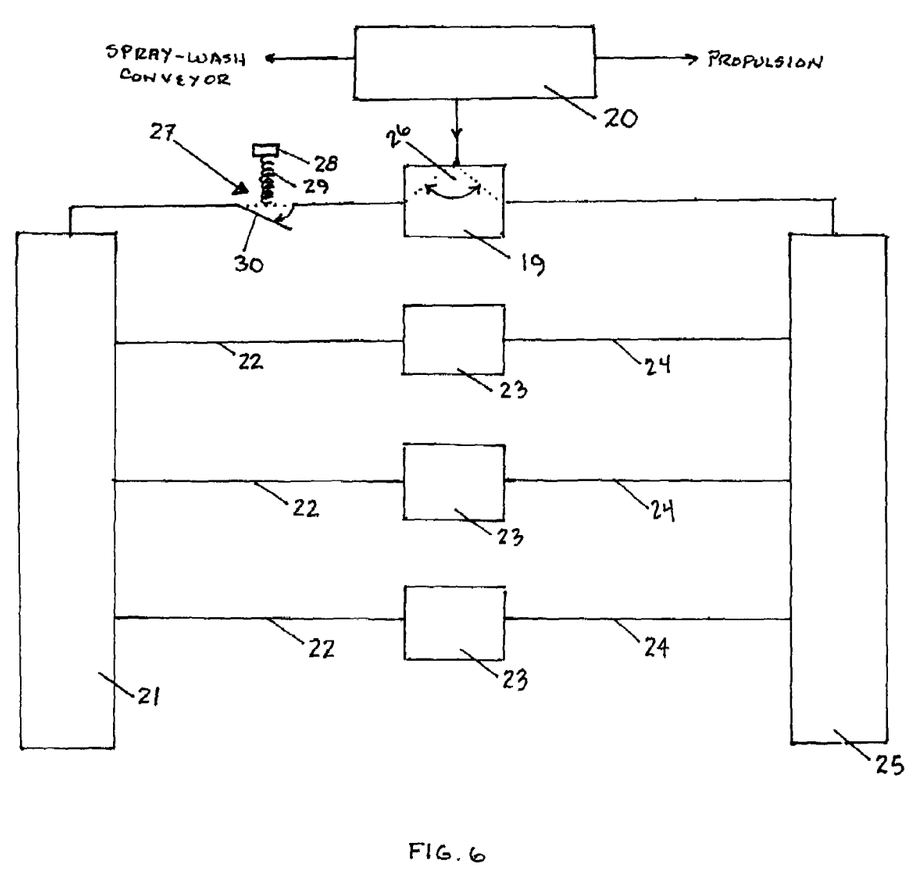
FIG. 6 shows a schematic diagram of a hydraulic drive system.

FIG. 6 shows a schematic diagram of the principal portions of a hydraulic drive system used to power conveyor belts 3, 4, 5. A hydraulic transmitter 19 is externally compensated by an engine 20 or other suitable source of hydraulic motor power. A hydraulic drive system on the preferred embodiment of the tote conveyor system taps into another hydraulic drive system which is used to provide hydraulic power to move a self-propelled spray-wash conveyor 1 and to drive horizontal and angled conveyor belts associated with a self-propelled spray-wash conveyor 1. A hydraulic transmitter 19 sends hydraulic fluid from a common supply manifold 21 through a hydraulic fluid supply line 22 to a hydraulic motor 23 which provides the driving force to a conveyor belt 3, 4, 5. Spent hydraulic fluid exits a hydraulic motor 23 through a hydraulic fluid return line 24 which takes hydraulic fluid back into a hydraulic transmitter 19 through a common return manifold 25.

A switching mechanism 26 inside a hydraulic transmitter 19 reverses the direction of movement of hydraulic fluid which causes a hydraulic motor 23 to reverse its direction of rotation and thereby reverse the direction of movement of a conveyor belt 3, 4, 5. The configuration of a switching mechanism 26 varies and can consist of devices such as a slosh plate, opposing-direction butterfly valves, direction-regulating pistons or blocks, or any similar type of device. Although FIG. 6 depicts a basic hydraulic drive system which is similar in some respects to those found in the prior art, this hydraulic drive system does contain unique features that I feel are necessary for the proper operation of the tote conveyor system.

This hydraulic drive system has a safety device 27 that permits an operator at either conveyor control station 11L, 11R to temporarily stop all movement of all conveyor belts 3, 4, 5 in the event of an emergency or slowdown in the delivery of agricultural products to a packing and filling station 8. An operator at a conveyor control station 11L, 11R simply depresses a foot pedal 28 installed on the floor at a conveyor control station 11L, 11R. This activates a solenoid switch 29 which closes a shutoff valve 30 and thereby stops the flow of hydraulic fluid. When an operator releases a foot pedal 28, a solenoid switch 29 is deactivated which permits a shutoff valve 30 to open thereby restoring the flow of hydraulic fluid. This hydraulic system also has a throttle 31 which permits an operator at a conveyor control station 11L, 11R to control the speed of all conveyor belts 3, 4, 5 by regulating the pressure of the hydraulic fluid supplied to hydraulic motors 23.

Figure 7:
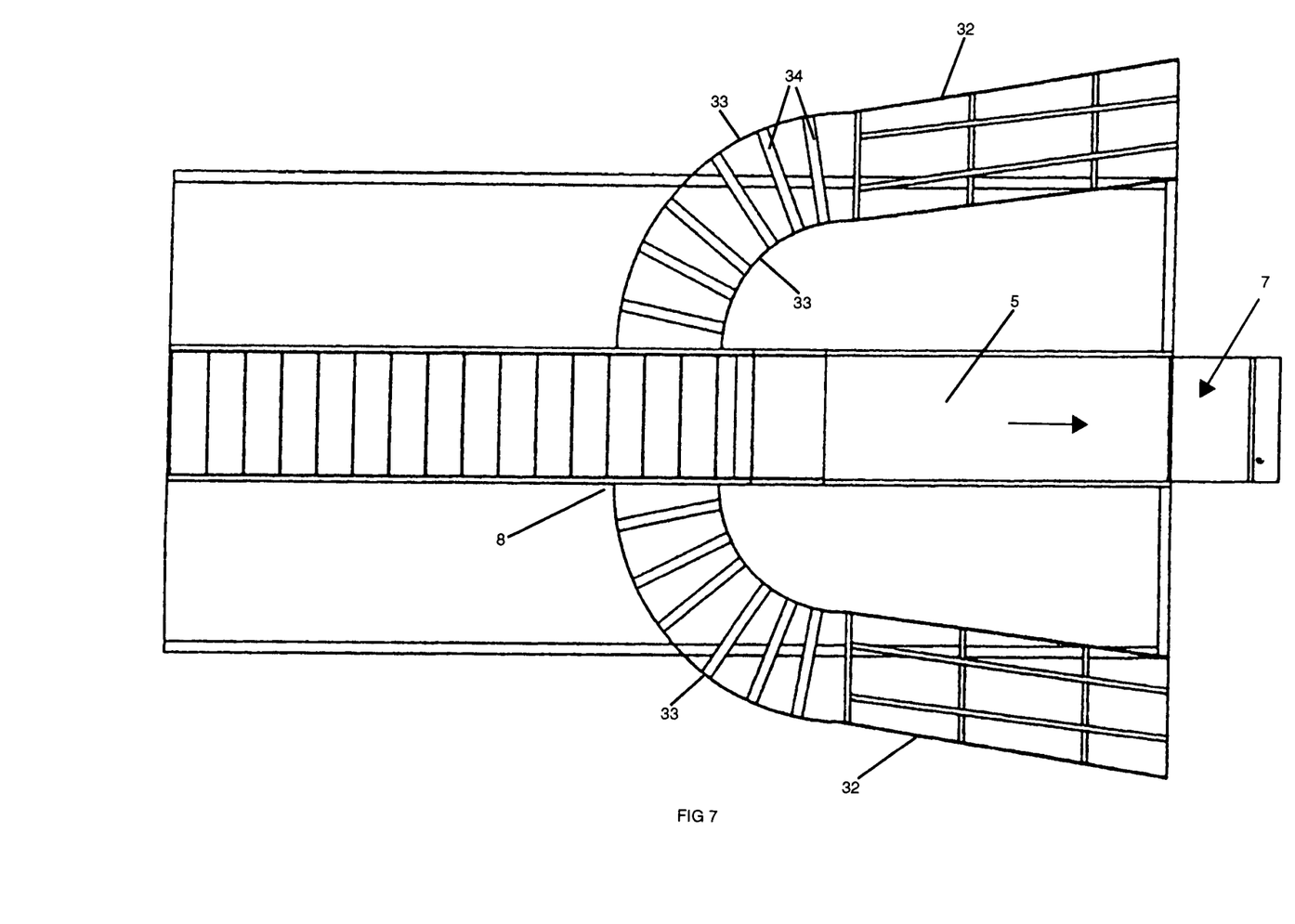
FIG. 7 shows a plan view of another embodiment using a gravity-feed delivery mechanism and one conveyor belt to move filled totes.

FIG. 7 is a plan view of another embodiment of the tote conveyor system. Angled ramps 32 replace delivery and removal conveyor belts 3, 5 and permit the gravity-driven delivery of empty totes 6 to a packing and filling station 8. Angled ramps 32 are configured with lateral frame members 33 that hold cylindrical rollers 34 which permit movement of a tote 6 down an angled ramp 32 to a packing and filling station. Once a tote 6 is filled, it must be manually placed onto a removal conveyor belt 5 which moves it to a loading station 7 where it is manually removed and placed on another platform for further transport to a packaging facility.

OPERATION OF THE INVENTION

In operation, three workers are needed to operate the tote conveyor system: one operator at a conveyor control station 11L, 11R to operate controls; one worker at a packing and filling station 8 to reposition, prune, or cull agricultural products coming from a discharge chute 9, and one worker to man both a loading station 7 and a removal station 10.

An operator at a conveyor control station 11L, 11R starts an external engine 20 and allows hydraulic pressure to build up throughout the hydraulic drive system. An operator returns to a conveyor control station 11L, 11R and positions a throttle 31 so as to start all three conveyor belts 3, 4, 5 moving. A worker at a loading station 7 begins sequentially placing empty totes 6 onto a delivery conveyor belt 3. A delivery conveyor belt 3 moves a tote 6 into position under a discharge chute 9 where it is filled with freshly harvested and spray-washed agricultural products supplied by a self-propelled spray-wash conveyor 1.

If necessary, an operator at a conveyor control station 11L, 11R can depress a foot pedal 28 which will temporarily cut off the flow of hydraulic fluid to all three hydraulic motors 23 thereby causing all three conveyor belts 3, 4, 5 to temporarily stop while a tote 6 is filled. When a tote 6 has been filled or the problem necessitating stopping all three conveyor belts 3, 4, 5 has been resolved, an operator can release a foot pedal 28 which will restore the flow of hydraulic fluid to all three hydraulic motors 23 thereby causing all three conveyor belts 3, 4, 5 to resume movement.

The right-angle placement of conveyor belts 3, 4, 5 permits clockwise or counter-clockwise movement of a tote 6 from a loading station 7 to a removal station 9. This is accomplished by simply engaging a switching mechanism 26 which reverses the direction of flow of the hydraulic fluid.

Description—Alternative Embodiment

Angled ramps 32 replace delivery and removal conveyor belts 3, 5 and permit the gravity-driven delivery of empty totes 6 to a packing and filling station 8. Angled ramps 32 are configured with lateral frame members 33 that hold cylindrical rollers 34 which permit movement of a tote 6 down an angled ramp 32 to a packing and filling station. Once a tote 6 is filled, it must be manually placed onto a removal conveyor belt 5 which moves it to a loading station 7 where it is manually removed and placed on another platform for further transport to a packaging facility.

CONCLUSION, RAMIFICATIONS, AND SCOPE

Accordingly, the reader will see that the tote conveyor system minimizes damage to freshly harvested and spray-washed agricultural products by reducing the vertical distance the agricultural products will fall after leaving the chute which guides the agricultural products into the transport receptacle. Further, the reader will see that the tote conveyor system eliminates operation downtime because filled totes can be lined up in a queue as the trailer transporting filled totes is hauled away and a new trailer is positioned to receive filled totes. In sum, the tote conveyor system described above has significant advantages over the prior art. Specifically, the tote conveyor system:

dramatically reduces bruising damage to field-packed agricultural products.

eliminates work-stoppage previously necessitated by positioning a trailer with empty receptacles under a discharge chute.

reduces the number of workstations necessary to pack agricultural products in a transport receptacle.

reduces the number of laborers necessary to pack a transport receptacle.

provides a means for on-site packing.

Although the description above contains many specifics, these should not be construed as limiting the scope of the invention but as merely providing illustrations of some of the presently preferred embodiments of this invention. For example, the tote conveyor system can be mounted on means of conveyance other than those described in the foregoing description. Further, the structural elements of the tote conveyor system can be fabricated from materials other than stainless steel or other non-corrosive, high tensile strength materials. Further still, the external source of power for the tote conveyor system can be any reasonable power source suitable for operational use in the field in an agricultural environment.

Accordingly, the scope of the invention should be determined by the appended claims and their legal equivalents, rather than by the examples given.

I claim:

1. A tote conveyor system comprising:
   a. a self-propelled spray-wash conveyor,
   b. a mounted platform situated on a rearward-directed and cantilevered structural frame extension of said self propelled spray-wash conveyor,
   c. a plurality of vertical support members of differing shapes and sizes and permanently attached perpendicularly to said platform,
   d. lateral support members attached perpendicularly to and on top of said vertical support members, and
   e. a positioning conveyor belt driven by an external power source and positioned between said lateral support members and at a height above said platform sufficient to permit a packing container moved by said positioning conveyor belt to clear the lower extremity of a vegetable discharge chute attached to said self-propelled, spray-wash conveyor.

2. The tote conveyor system of claim 1 wherein said positioning conveyor is a plurality of evenly-spaced parallel rollers positioned along the entire length of and between said lateral support members.

3. The tote conveyor system of claim 1 further comprising:
   a. two parallel downward-sloping conveyor belts adjacent to and at opposite ends of said positioning conveyor belt,
   b. said downward-sloping conveyor belts positioned so that their lower edges terminate at a line immediately adjacent to and at a 90 degree angle to the right of the inboard edge of said positioning conveyor belt,
   c. said downward-sloping conveyor belts utilizing the same source of external power source as said positioning conveyor belt,
   d. said downward-sloping conveyor belts horizontally positioned between additional parallel lateral support members,
   e. said additional lateral support members perpendicularly attached to and on top of additional vertical support members,
   f. said additional vertical support members perpendicularly attached to said mounting platform,
   g. safety shields created by the vertical upward extension of certain of said vertical support members and certain of said additional vertical support members, and
   h. curved tubular guide rails connecting the upper corner of the lower edge of said additional lateral support members to the nearest upper corner of said lateral support member supporting said positioning conveyor belt.

4. The tote conveyor system of claim 1 wherein said external power source is an externally compensated hydraulic drive system,
   a. said externally compensated hydraulic drive system having an emergency means of terminating the flow of hydraulic fluid through said externally compensated hydraulic drive system, and
   b. said externally compensated hydraulic drive system having a means of controlling or throttling the pressure of hydraulic fluid flowing through said externally compensated hydraulic drive system and thereby controlling the speed of movement of said positioning conveyor belt.

5. A tote conveyor system comprising:
   a. a gravity-fed empty tote delivery system constructed of an angled series of metallic rollers that allow an empty tote to move downward along a guided path to a predetermined end-point,
   b. a collection and filling platform which is said predetermined end point for said gravity-fed empty tote delivery system,
   c. a conveyor belt assembly which moves a filled tote from said collection and filling platform to a position where said filled tote is physically forced off said conveyor belt assembly and onto a stationary platform, and
   d. an external source of power to drive said conveyor belt assembly.

6. A method of conveying totes comprising the steps of:
   a. loading a transport receptacle onto a conveyor,
   b. moving said transport receptacle along said conveyor to a filling station beneath a discharge chute,
   c. allowing said transport receptacle to be filled with agricultural products from said discharge chute,
   d. moving said transport receptacle to a removal and loading station, and
   e. loading said filled transport receptacle onto an external platform.

* * * * *